United States Patent [19]
Hirst

[11] 3,797,851
[45] Mar. 19, 1974

[54] VEHICLE SUSPENSION SYSTEMS
[75] Inventor: Archie John Hirst, Leicester, England
[73] Assignee: The Dunlop Company Limited, London, England
[22] Filed: Nov. 26, 1971
[21] Appl. No.: 202,704

Related U.S. Application Data
[62] Division of Ser. No. 13,356, Feb. 24, 1970, abandoned.

[52] U.S. Cl. .......................... 280/124 R, 267/63 R
[51] Int. Cl. ............................................ B60g 11/24
[58] Field of Search...... 267/63 R, 63 A; 280/124 R

[56] References Cited
UNITED STATES PATENTS
2,872,207  2/1959  Hirst ................... 267/63 A
2,995,383  8/1961  Barker ..................... 267/63
3,279,820  10/1966  Hickman .................. 267/63 A FOREIGN PATENTS OR APPLICATIONS
1,008,964  5/1957  Germany .................. 267/63 A Primary Examiner—Philip Goodman
Attorney, Agent, or Firm—Harness, Dickey & Pierce

[57] ABSTRACT

A spring for use under compression and shear loading comprising a stack of rubber blocks interleaved with and bonded to parallel metal plates, successive blocks being progressively displaced in a common direction perpendicular to the direction of stacking of the blocks so that the stack has an echelon profile, at least one of the blocks being provided with a space formed in the central region thereof, of which the following is a specification.

1 Claim, 8 Drawing Figures

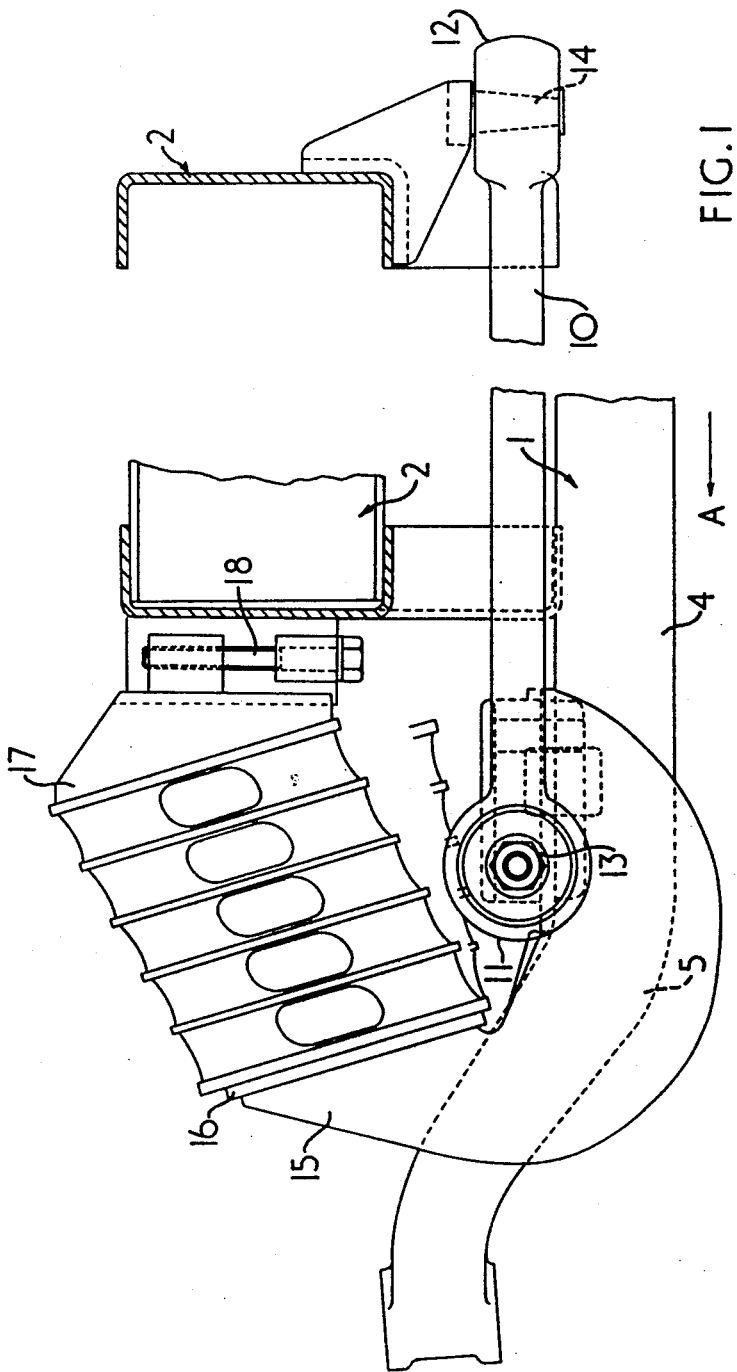

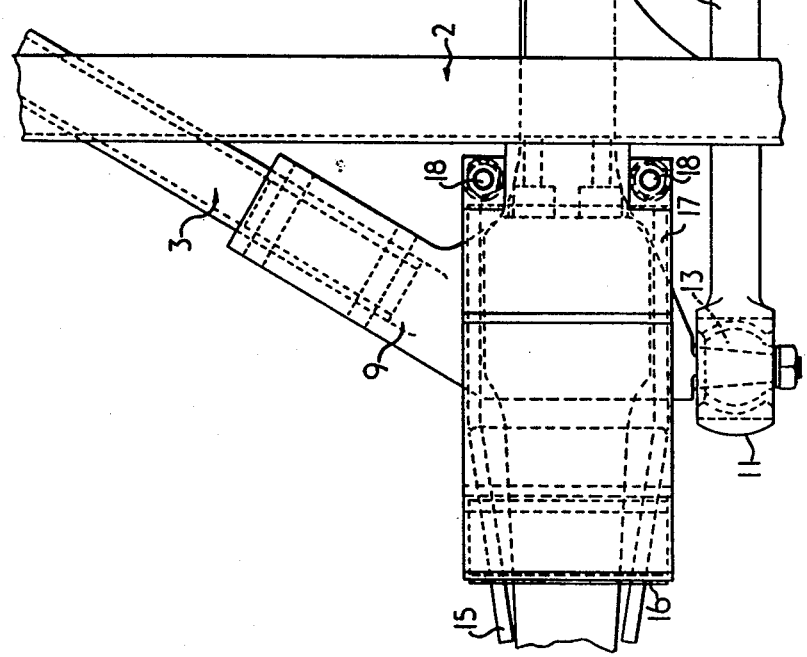

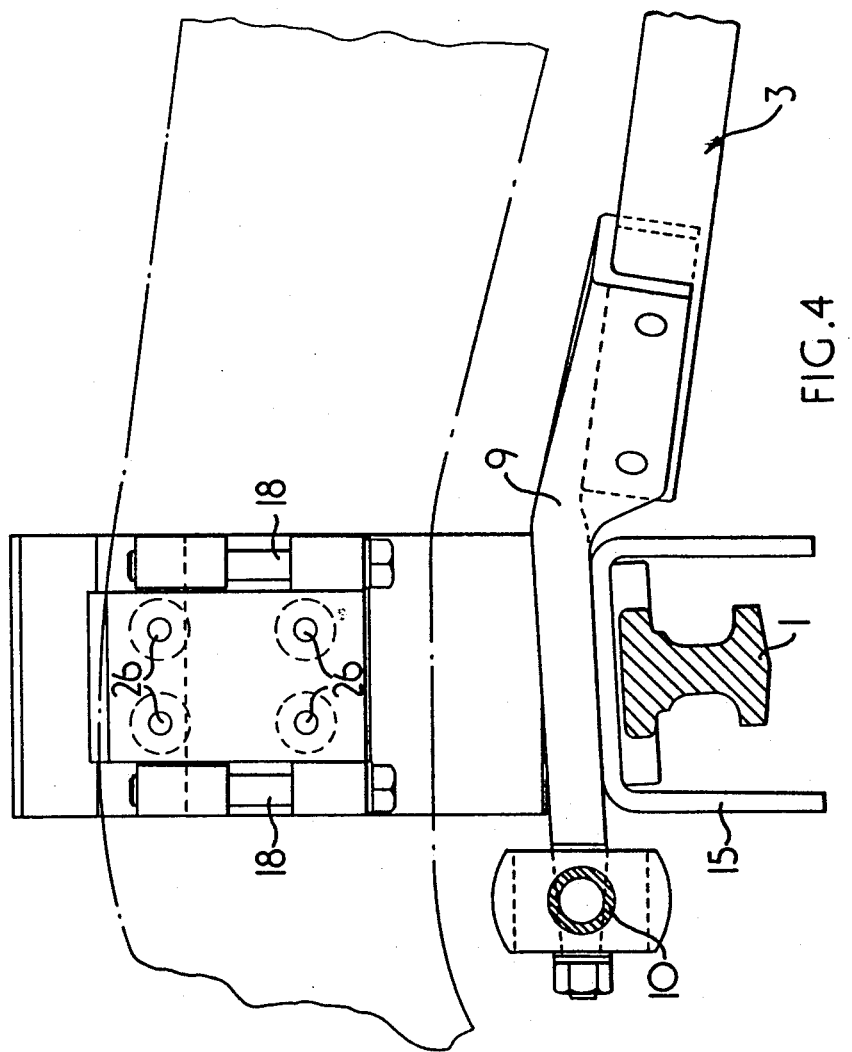

VEHICLE SUSPENSION SYSTEMS

This is a division, of application Ser. No. 13,356, filed Feb. 24, 1970 now abandoned.

This invention relates to springs, for use under compression and shear loading, of the kind comprising a stack of resilient blocks having parallel metal plates interleaved between and bonded to the resilient blocks, successive blocks being progressively offset in a common direction perpendicular to the direction of stacking of the blocks, so that the stack has an echelon profile, and to vehicle suspension systems incorporating springs of the kind described.

When a spring of the kind described is subjected to compression and shear forces the spring is deflected to a position in whcih the internal stresses in the spring are in a state of equilibrium with the external forces. In this position at least some of the intermediate metal plates may tilt relative to the other plates and the associated resilient blocks become deformed to wedge shapes. This deformation gives an uneven distribution of stress in the blocks which may give rise to excessive stress being placed on some parts of the spring causing a reduction in the lift of the spring and placing a limitation on the load-bearing capacity of the spring.

One object of the present invention is to provide an improved spring of the kind described.

A further object of the present invention is to provide an improved vehicle suspension system incorporating springs having an echelon profile.

According to one aspect of the present invention a spring for compression and shear loading comprises a plurality of resilient blocks interleaved with, and bonded to, metal plates and having a construction which is of echelon profile, at least one of the resilient blocks having a space opening formed in the central region thereof.

The metal plates may be flat plates of any suitable form, for example, they may be of square, rectangular or circular form, alternatively the spring may be of the Chevron type having V-shaped metal plates and resilient blocks.

More than one resilient block, or all the blocks, may have spaces, and the spaces may each be in the form of a opening in one side of a block, the axis of the opening being perpendicular to the direction of offset of the blocks and perpendicular to the direction of stacking of the blocks.

Each opening may also be arranged so that the axis of the opening intersects the longitudinal axis of the spring.

Alternatively at least some of the openings may be arranged in positions in the respective blocks which, considered in the direction of offset of the blocks, are offset relative to the longitudinal axis of the spring.

According to a further aspect of the present invention a vehicle suspension system comprises an axle assembly suspended at each end from an associated vehicle body support member by a spring in accordance with the present invention, each spring having a first end for association with the axle assembly and a second end for associated with the vehicle body support member, in the unloaded state of the vehicle body the second end being higher than and displaced laterally of the first end.

Preferably the position and inclination of each spring relative to the axle assembly is arranged so that the resultant load applied to the axle assembly through the springs produces a bending moment in the central portion of the axle assembly which completely, or almost completely, balances the bending moment produced in the central portion of the axle assembly by the vertical reaction to the said applied load.

With this arrangement bending stresses in the central portion of the axle assembly may be reduced.

One embodiment of the invention will now be described by way of example with reference to the accompanying drawings of which:

FIG. 1 is a side view of a vehicle suspension system in accordance with the present invention, looking along the longitudinal axis of the vehicle;

FIG. 2 is a plan view of the system shown in FIG. 1;

FIG. 3 is a plan view of an A-frame pivotal attachment suitable for use in the system shown in FIG. 2;

FIG. 4 is a side view of the system shown in FIGS. 1–3 with the vehicle body support member removed, looking in the direction of the arrow A of FIG. 1;

Figure 5:
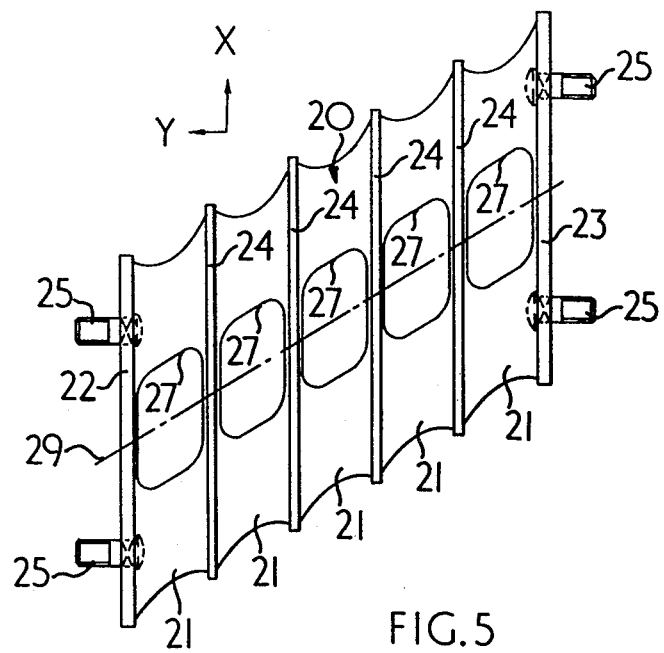
FIG. 5 is a side view of a spring in accordance with the present invention.

A suspension system for a front axle (shown in FIGS. 1–4) comprises a beam axle 1 located on a vehicle body support member 2 by means of an A-frame (see FIG. 2). The beam axle has a straight central portion 4 arranged horizontally with respect to the vehicle body and two curved end portions 5 to carry stub axles (not shown) for the associated wheels 6 (see FIG. 2). The A-frame 3 is pivotally mounted at its apex 7 for pivotal movement about a transversely extending horizontal axis 8 (see FIG. 3) on a support member of the vehicle body (not shown) to the rear of the axle with respect to the vehicle body. The two ends 9 of the frame, only one of which is shown, are rigidly secured respectively to the two ends of the horizontal portions of the axle. A transversely extending Panhard rod 10 is provided for lateral location of the axle with respect to the vehicle body, the two ends 11, 12 of the Panhard rod being secured by means of rubber bushed pivots 13, 14 respectively to one end of the horizontal portion of the axle and to a portion of the support member of the vehicle body.

Each end of the horizontal portion of the axle has a bracket 15 secured thereto and an abutment 16 is formed on the bracket. A second confronting abutment 17 is bolted to a portion of the support member of the vehicle body at a position higher than and displaced laterally inwardly of the position of the abutment 16 on the bracket with respect to the vehicle body.

The bolts 18 securing the second abutment to the vehicle body support member are adjustable for levelling of the vehicle body.

Figure 6:
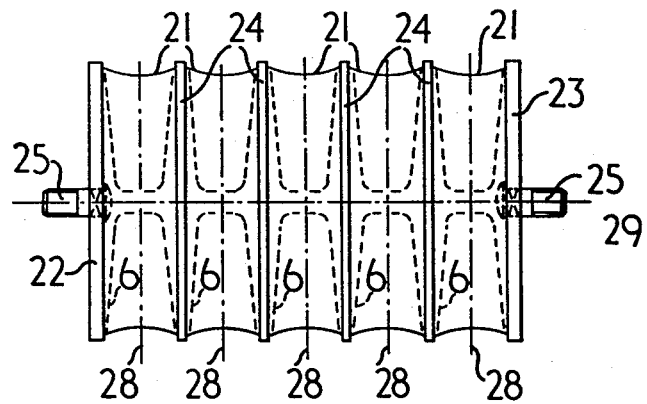
FIG. 6 is an end view of the spring shown in FIG. 5.

A spring in accordance with the present invention (shown in FIGS. 5 and 6), comprising a stack of rectangular blocks 21 of rubber interposed between and bonded to rectangular metal and plates 22, 23 and having rectangular intermediate metal plates 24 interleaved between and bonded to the blocks, is mounted between the abutments 16 and 17 and is secured thereto by means of bolts 25 secured to the end plates and engageable with holes formed in the abutments (see the holes 26 shown in FIG. 4).

The abutments 16, 17 are arranged parallel to each other are are, in the unloaded state of the vehicle body, offset so that the abutment 17 on the vehicle body support member is higher than the abutment 16 of the bracket with respect to the vehicle body.

The rubber blocks 21 of the spring are arranged with successive blocks progressively offset in a common direction X perpendicular to the direction of stacking Y of the blocks so that in the unloaded state the two end plates of the spring are offset by the same amount as the offset abutments.

When the vehicle body is loaded, an additional load is applied to the spring and the spring is deflected both by compression and shear forces, the shear forces acting on the spring tending to deflect the spring in an opposite direction to the direction in which the rubber blocks are displaced.

The spring will be deflected to a position in which the internal stresses in the rubber blocks are in equilibrium with the compression and shear forces.

Spaces or openings in the form of substantially trapezoidal-cross-section openings 27 are formed in the central sections of the rubber blocks. The centers 28 of the openings are perpendicular to both the direction of displacement X and the direction of stacking Y of the blocks. Each rubber block has two such openings on opposite sides of the block, there being a thin wall of rubber between the openings.

Each opening is arranged within its respective block so that the center of the opening intersects the longitudinal axis 29 of the spring. The longitudinal axis of the spring is defined, for the purposes of this specification, as the line joining the respective centroids of the rubber blocks of the spring or the closest equivalent to such a straight line if the centroids are not co-linear. The spring is constructed with the end plates offset relative to each other by a predetermined amount so that when the vehicle body is fully loaded the line of action of the resultant of the compression and shear forces acting on the spring is along the longitudinal axis of the spring and hence the centres of pressure of the blocks also lie along the longitudinal axis ensuring that the metal plates are parallel to each other.

In conditions where the load applied to the spring is greater than or less than the load required to deflect the spring to the position in which the metal plates are parallel to each other the metal plates will tilt. The tendency of the intermediate plates to tilt may be reduced and thus the stability of the spring improved by increasing the second moment of area of the blocks about an axis at right-angles to their directions of stacking Y and displacement X. This increases in the second moment of area of the blocks may be produced by an increase in the dimensions of the blocks in a direction parallel to the direction of displacement X which reduces the tilting of the plates and increases the compressive loading which can be carried without lateral buckling occurring.

The increase in the dimensions of the spring causes a corresponding increase in the stiffness rate of the spring. This increase in stiffness rate is compensated in the construction in accordance with the present invention, by the provision of openings in the blocks. These blocks lower the spring stiffness rate without greatly affecting the stability advantages derived from the increase in dimensions.

The provision of openings also provides extra buldge surface in the centres of the blocks and this enables the spring to be formed from rubber blocks which have a smaller compressive stiffness than would be the case with a spring formed from solid rubber blocks having the same volume of rubber.

In addition, the tilting of individual intermediate plates can be reduced by increasing the number of plates in the spring. Increasing the number of intermediate plates does, however, also increase the compressive stiffness of the spring. This can, however, be offset by the reduction in compressive stiffness caused by the provision of openings. In this manner a spring can be constructed from rubber blocks provided with openings which have a greater number of intermediate metal plates and consequently in which tilting of the individual plates is less than would be the case with a spring formed from solid rubber blocks and having the same compressive stiffness.

Figure 7:
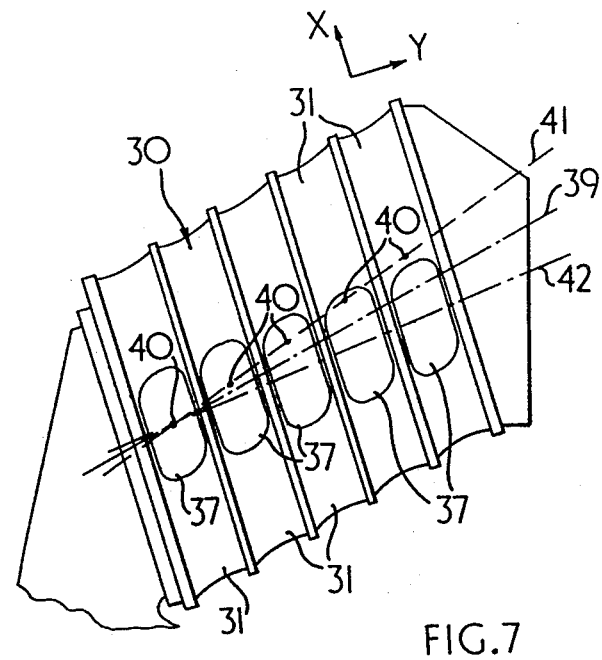
FIG. 7 is a diagrammatic side view of a modified form of spring in accordance with the present invention.

In a first modification of the embodiment described above (shown in FIG. 7) some of the openings 37 are arranged in the respective blocks 31 in offset positions relative to the longitudinal axis 39 of the spring 30. The openings are arranged so that their centers extend at right-angles to the direction of offset X and direction of stacking Y of the spring, the centers also being progressively offset from the longitudinal axis of the spring. The opening or openings in the block at the higher end of the spring, considered when in an operational position, is or are arranged to be offset from th longitudinal axis of the spring, in the opposite direction to the direction of offset X of the blocks, by the largest amount. With this arrangement the centres of pressure 40 of the blocks lie on a line 41 which is inclined to the longitudinal axis 39 of the spring in the opposite sense to the line 42 on the axes of the socket 37 lie. This offset construction gives a spring of a much more compact form which is the operational equivalent of a spring in which the line 41 is the longitudinal center and in which the axis of each opening is arranged to intersect the longitudinal axis of the spring.

In one example (not shown) of the modification described above the openings are arranged in the respective blocks so that when the vehicle body is fully loaded the spring is deflected to a position in which the metal plates are parallel to each other and the end plates are aligned so that the longitudinal axis of the spring is perpendicular to the plane of the plates. This arrangement ensures that the amount by which the end plates are offset in the unloaded state is as small as possible and consequently the space taken up by the spring is also as small as possible.

In a second modification, also not shown, of the embodiment described above the spaces or openings in the rubber blocks are each in the form of two intersecting bores in a cruciform shape. The opening in each block is arranged with one bore having its center perpendicular to the direction of offset X and the direction of stacking Y of the blocks. The other bore is arranged with its center parallel to the direction of displacement X of the blocks. With this arrangement it is ensured that the spring has an improved stability to buckling both in the direction of displacement of the blocks and in a direction perpendicular to that direction.

In order to minimise the bonding moment exerted on the horizonal central portion of the axle the inclination of the abutments and the offset arrangement of the spring are arranged such that in the normal loaded state of the vehicle body the resultant F (see FIG. 8) of the compression and shear forces acting on the spring due to the weight of the spring portion of the vehicle intersects a line 50 along the axis of the horizontal portion of the axle at a point 51 on a vertical plane perpendicular to this axis containing the controid of the area of contact of the associated wheel with the road surface.

Figure 8:
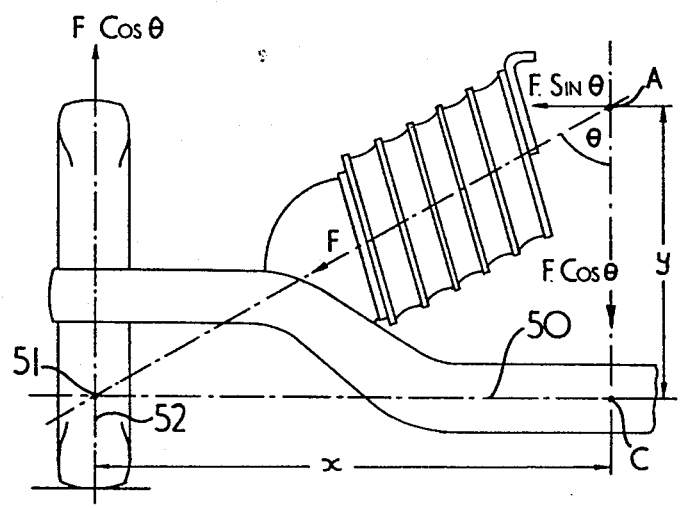
FIG. 8 is a simplified diagrammatic representation of the suspension system shown in FIG. 1, showing the forces acting on the centre portion of the axle.

This plane is represented by the line 52 of FIG. 8. With this arrangement, at a point A on the line of action of the resultant force F vertically above the centre C of the axle, the resultant form F may be resolved into a vertical component $F.\cos\theta$ and a horizontal component $F.\sin\theta$ the vertical component producing zero moment about the centre of the axle and the horizontal component producing a bending moment of $F.\sin\theta.y$ where $y$ is the vertical distance of the line of action of the resultant force F above the centre of the axle. Neglecting the unsprung weight of the vehicle. the vertical reaction $F.\cos\theta$ transmitted through the wheels produces a moment about C of value $F.\cos\theta.x$, where $x$ is the horizontal distance from the centre of the axle of the vertical plane containing the centroid of the area of contact of the wheel. This moment is in an opposed sense to, and therefore can be arranged to balance, the moment $F.\sin\theta.y$. Thus it is ensured that bending stresses in the axle are minimised.

The Panhard rod 10, shown in FIGS. 1-4, acts as an anti-roll bar to prevent pivotal movement of the vehicle body, under the influence of transverse forces, about the instantanous centre of the system which would otherwise lie a small distance below the point of intersection of the compression axes of the springs. Such pivotal movement would in the case where a Panhard rod was not provided be resisted largely by shear of the springs. The provision of the Panhard rod increases the roll stiffness of the system and lowers the instantaneous centre to a position in which the pivotal movement is resisted largely by compression of the springs.

In a vehicle suspension system as described above employing springs having a greater stiffness in compression than in shear, vertical deflections of the vehicle body are resisted by compression and shear of the springs whereas transverse deflections of the vehicle body are resisted largely by compression of the springs and Panhard rod. Thus the suspension system provides soft springing with respect to vertical deflections and stiff springing with respect to transverse deflections of the vehicle body.

A vehicle suspension system as described above is comparatively inexpensive, compact and uncomplicated in design whilst having the advantages of reducing bending stress in an associated axle, providing soft springing while maintaining anti-roll stiffness and ensuring good location of the axle.

Having now described my invention, what I claim is:

1. A spring for use under compression and shear loading comprising a plurality of resilient blocks interleaved with and bonded to metal plates and being stacked with each block being offset to one side of the next adjacent block in an echelon profile, said resilient blocks being formed with openings extending through at least one side thereof, said openings extending generally perpendicular to the direction of stacking and offset, the centers of the openings also being progressively offset from the longitudinal axis of the spring from one end of the spring to the other with the offset of the openings being in the opposite direction to the direction of offset of the blocks.

* * * * *